US005568996A

United States Patent [19]

Buehler

[11] Patent Number: 5,568,996

[45] Date of Patent: Oct. 29, 1996

[54] STORAGE AND DISPOSAL OF ORGANIC WASTE

[75] Inventor: Charles H. Buehler, Etobicoke, Canada

[73] Assignee: Organic Resource Management Inc., Mississauga, Canada

[21] Appl. No.: 500,502

[22] Filed: Jul. 11, 1995

[51] Int. Cl.$^6$ .......... B09B 5/00

[52] U.S. Cl. .......... 405/129; 210/252

[58] Field of Search .......... 405/129, 128; 210/252, 257.1, 258, 262

[56] References Cited

U.S. PATENT DOCUMENTS

| | | | |
|---|---|---|---|
| 3,947,357 | 3/1976 | Cherry | 210/170 |
| 3,992,986 | 11/1976 | Sutton | 405/129 X |
| 4,182,246 | 1/1980 | Lombana et al. | 110/188 |
| 4,219,415 | 8/1980 | Nassef et al. | 210/668 |
| 4,473,477 | 9/1984 | Beall | 210/691 X |
| 4,844,839 | 7/1989 | Manehak, Jr. | 405/129 X |
| 4,936,996 | 6/1990 | Messing | 210/603 |
| 5,441,632 | 8/1995 | Charon | 210/170 |

*Primary Examiner*—Frank Tsay
*Attorney, Agent, or Firm*—Mirek A. Waraksa

[57] ABSTRACT

A system for handling organic waste at a food-handling facility includes a mill that reduces the volume of the waste and a below-ground storage tank that receives the milled waste. A ventilation line and an air flow producer draw air from the storage tank, placing the tank under negative pressure and preventing noxious odors from escaping into the facility. A rigid suction line extends from the interior of the storage tank to points external to the tank and the facility itself. A suction truck periodically removes the waste stored in the tank, applying suction to the suction line to draw the stored waste into a portable tank aboard the truck. The suction truck transports the waste to a disposal site where the well-divided waste may be expelled onto and incorporated by tilling into soil for decomposition by soil organisms.

8 Claims, 1 Drawing Sheet

STORAGE AND DISPOSAL OF ORGANIC WASTE

FIELD OF THE INVENTION

The invention relates to systems and methods for handling organic waste produced at a food-handling facility, such as grocery stores, meat packing plants, restaurants, and other establishments where food products are produced, distributed or consumed.

BACKGROUND OF THE INVENTION

"Organic waste" for purposes of this specification is essentially animal and vegetable matter. In some instances, the organic waste produced by a food-handling facility can be convened into livestock feed. Quite often, however, such waste is simply dumped.

In a large grocery store, organic waste is often collected in small receptacles, then transferred to large plastic bags, and then placed in large bins outside the store for pick-up by a disposal service. The waste is then carted to a disposal site, such as a landfill, where it may be buried. There are several shortcomings to such practices. Often valuable commercial space must be dedicated to handling and storage of waste. The cost of transporting and dumping large volumes of waste has increased very significantly in recent years, and repeated manual handling by staff of the food-handling facility contributes further to costs. Unless subject to further processing, the waste is in a form suitable only for landfill sites. Organic waste dumped in landfill sites tends to decompose slowly because oxygen and appropriate nutrients required by soil organism for decomposition are lacking. Dumping waste in plastic or paper containers further hampers decomposition and recycling of organic materials to the soil. Such practices and shortcomings are characteristic of other food-handling facilities.

Another common approach is to dispose of organic waste in sanitary sewage lines. The waste may be ground in a mill, mixed with copious quantities of water, and then flushed into a sanitary line. This approach is convenient from the perspective of the food-handling facility, requiring minimal dedication of floor space and manual handling of waste. However, problems associated with waste handling are in essence transferred to the water treatment plant. The plant must separate the waste from the water, treat the water before discharge to the environment, and then dispose of the solid waste. As well, appropriate sanitary lines must be provided and then maintained clear of obstructions. The cost of such operations must be borne either by the food-handling facility or the water treatment plant.

BRIEF SUMMARY OF THE INVENTION

The invention provides a system for handling organic waste at a food-handling facility. The system includes a mill that mills the waste to increase its bulk density and reduce its volume. The milled waste is then conveyed to a storage tank. The storage tank is preferably installed below ground to reduce demand on commercial space, and the mill is preferably located above the storage tank to permit conveying of the waste under gravity into the tank. A suction line is connected to the tank, extending from the interior of the tank, preferably as close to the bottom of the tank as possible, to points external to the tank and the facility itself. A connector is preferably mounted on an outlet end of the suction line to permit immediate coupling to suction equipment for eventual removal of the stored waste. The suction line permits agitation of the contents of the tank with pressurized air and then removal of the contents with suction. A ventilation line is preferably installed that has an inlet communicating with the interior of the tank and an outlet external to the storage tank and the facility. An air flow producer may be mounted in the ventilation line to draw air from the storage tank into the line, thereby placing the interior of the storage tank under negative pressure. This prevents odor build-up within the tank escape and also prevents noxious odors from potentially escaping through the mill and permeating the interior of the food-handling facility. From the perspective of the food-handling facility, waste handling is simple, not requiring repeated handling, bagging of waste, dedication of floor space or special efforts to preclude access by rodents and small animals.

The organic waste in the storage tank may drawn by suction into a portable tank mounted on a disposal vehicle. The disposal vehicle can then transport the waste to either a disposal site or a temporary storage site where the vehicle's suction equipment can be operated to pressurize the interior of the portable tank and discharge the waste. Reducing the volume of the waste by milling and using suction handling to transfer waste reduces handling and transportation costs per unit volume to a level that cannot be readily achieved by prior art disposal systems. Unlike disposal involving sanitary lines, there is no need to separate the waste, purify entraining water flows, or install and maintain sewage lines. Since the stored organic waste is well divided and free of plastic or paper bags, it lends itself to immediate incorporation into soil in a field and to rapid decomposition by soil organisms, which is the preferred method of disposal. The waste is simply transported to the field in a suction-type disposal vehicle and discharged under pressure onto the plough layer of the field which is then tilled in a conventional manner.

Various aspects of the invention have been identified above. Other features of the invention will be apparent from a description below of preferred embodiments, and the various aspects of the invention will be more specifically defined in the appended claims.

DESCRIPTION OF THE DRAWINGS

The invention will be better understood with reference to drawings in which.

DESCRIPTION OF PREFERRED EMBODIMENTS

Figure 1:
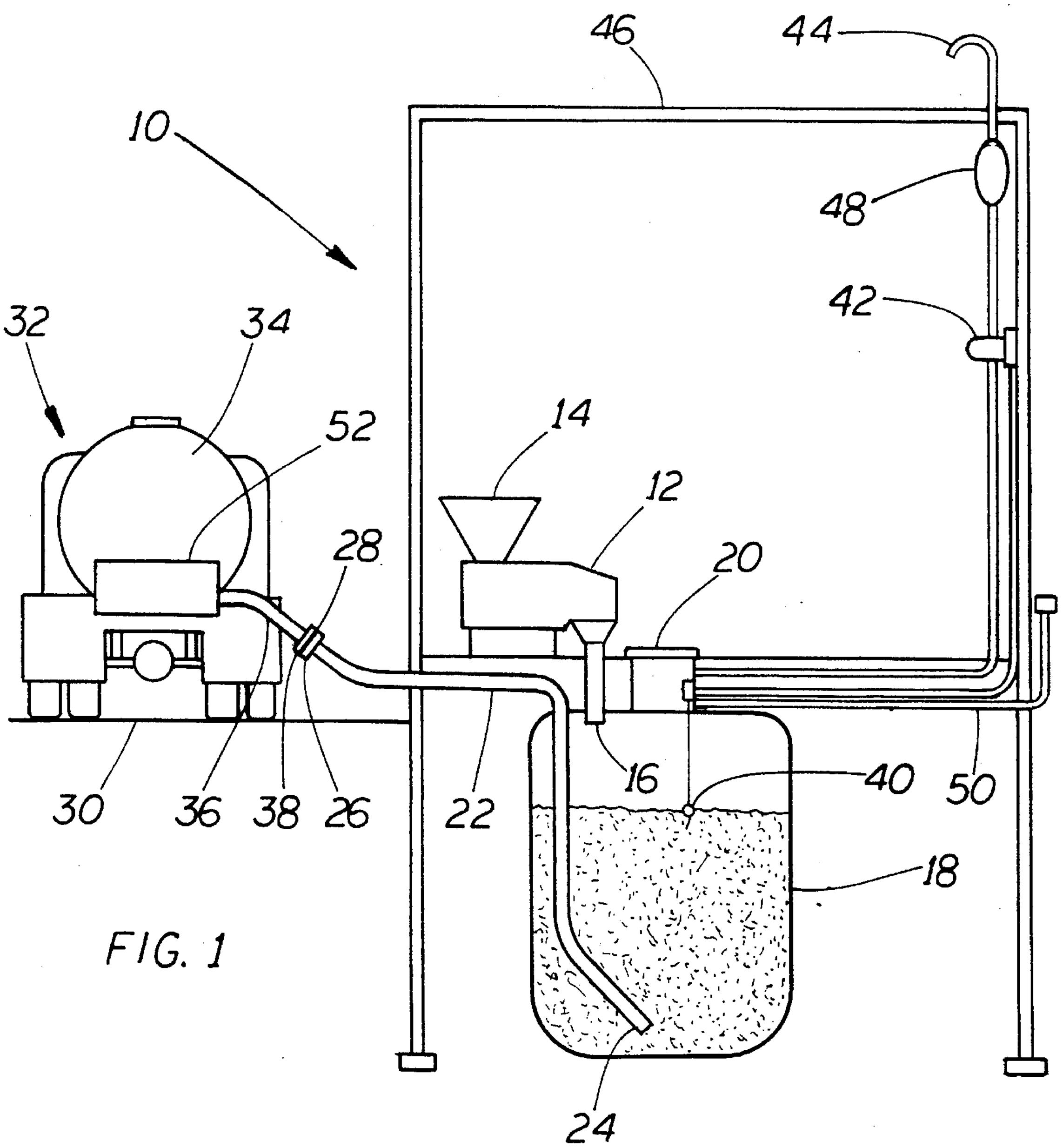
FIG. 1 diagrammatically illustrates a waste storage system associated with a food-handling facility and a vacuum truck used to remove waste accumulated in the storage system; and, FIG. 2 diagrammatically illustrates disposal of the waste removed by the vacuum truck into a field for incorporation into soil in a field.

FIG. 1 shows a system for handling organic waste at a food-handling facility 10 such as a large grocery store. The system includes a mill 12 with a hopper 14 for receiving organic waste. The mill 12 preferably has a conventional screw drive (not illustrated) that feeds the waste deposited in the hopper 14 to a conventional hammer mill (not illustrated) contained within the mill 12. The general object is to divide and reduce the waste material into relatively fine particulates. In a grocery store, the mill 12 might typically increase the bulk density of typical organic waste materials seven- or eight-fold, reducing storage requirements and subsequent transportation costs. The well-divided waste material flows under gravity through an 8-inch conduit or chute 16 formed of polyvinylchloride (PVC) into the interior of a large below-ground storage tank 18, which might have a capacity of 3000 gallons. If an external above-ground tank is used, any conventional powered conveyor may be substituted for the chute 16, if necessary, to serve as means for conveying the waste to the storage tank.

The storage tank 18 is preferably formed of plastic reinforced with glass fiber. A large access hatch 20 allows direct access to the interior for general maintenance and inspection. Waste is actually removed through a rigid 6-inch PVC suction line 22 mounted to the storage tank 18. The suction line 22 has an inlet 24 which is located proximate to the bottom of the tank and an outlet 26 external to the facility 10. A conventional vacuum connector 28 terminates the outlet 26 of the suction line 22. The outlet 26 and vacuum connection 28 will normally be located adjacent to a driveway 30, allowing access by a conventional suction truck 32 with a portable tank 34. A flexible suction line 36 with a complementary vacuum connection 38 may be extended from the truck 32 and connected to the rigid suction line 22 associated with the facility's storage tank 18. A conventional level sensor 40 is mounted within the storage tank 18 and is tripped when the storage tank 18 is about three-quarters full. When tripped, the sensor 40 actuates an indicator light 42 positioned proximate to the mill 12 to alert staff to the need to call the disposal truck 32.

A ventilation system is provided to remove odors. An exhaust line 44 extends from the interior of the storage tank 18 to a location above the roof 46 of the facility 10. It may typically be a four-inch PVC line. An air flow producer 48 is installed in the exhaust line 44 and may produce a flow of about 400 cubic feet per minute. The flow producer 48 draws air from the interior of the tank 18, placing the tank 18 under negative pressure. This reduces the likelihood that odors will travel up through the chute 16 and mill 12 into the interior of the facility 10. A four-inch PVC inlet line 50 extends from the interior of the tank 18 to the exterior of the facility 10 to permit fresh air to be drawn into the storage tank 18. Its purpose is to allow ventilation during evacuation of the contents of the tank 18 under negative pressure, avoiding potential collapsing of the tank 18. Although not illustrated, the inlet line 50 may be positioned proximate to the suction line 22, allowing the line 50 to be closed with a conventional cap until the tank 18 is to be evacuated.

The overall method of handling waste produced by the facility 10 will be briefly described. The organic waste is deposited in the hopper 14 of the mill 12. The mill 12 then divides and reduces the waste, discharging the waste under gravity into the storage tank 18. The ventilation system is continually operated to remove odors. When the tank 18 is in excess of three-quarters full, the indicator light 42 is actuated and the vacuum truck 32 may be requested to remove the accumulated waste. The portable tank 34 of the vacuum truck 32 is coupled to the rigid suction line 22. Before applying suction to the suction line 22, however, the suction equipment 52 of the truck 32 is operated to pressurize the interior of the portable tank 34, pumping air through the suction line 22 into the below-ground storage tank 18 to agitate its contents. Suction may then be applied to the line 22 to draw the accumulated waste into the portable tank 34. It should be noted that provision of the rigid suction line 22 fixed to the tank 34 is important. The nature of the waste does not permit a flexible portable suction line to be readily extended from the disposal truck 32 into the contained waste, as through the access hatch 20. A portable suction line also does not lend itself to agitating the accumulated waste with pressurized air flows. (If, however, an appropriately shaped above-ground tank is provided, a suction connector at the bottom of the tank is sufficient to serve as the suction line required to allow both agitation and uptake of its content.) Once the waste has been transferred to the portable tank 34, the disposal truck 32 will typically transport the waste to a temporary storage reservoir (not illustrated) that may simply be a large pit. The suction equipment 52 may be operated to pressurize the interior of the tank 34 to expel its contents through the suction line 36 into the pit.

Figure 2:
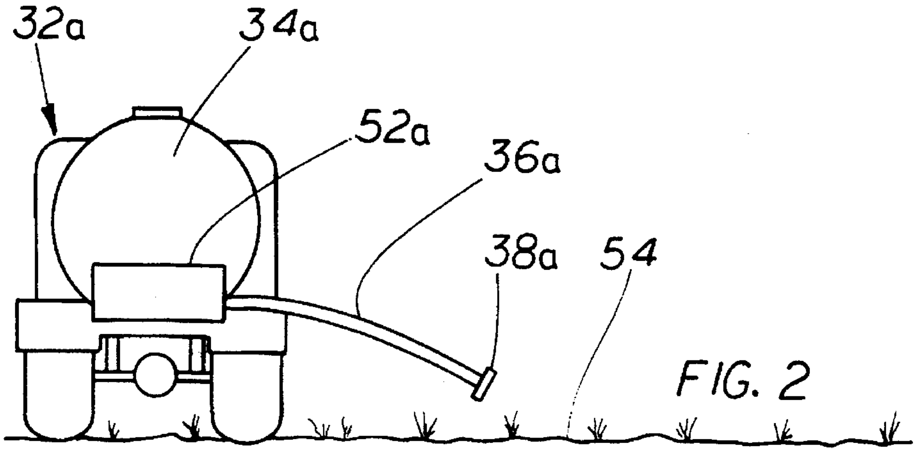

The waste is in a finely-divided form particularly appropriate for disposal in the plough layer of a field, essentially as a soil enhancer. A suction truck **32*a* (shown in FIG. 2) which is equipped with balloon-type tires may be used for such purposes. Components of the truck 32*a* that are shared with the truck 32** have been indicated with the same reference numerals followed by the letter "*a*." The suction equipment **52*a* of the truck 32*a* may be operated to draw waste from the temporary storage site into the truck's portable storage tank 34*a*. The truck 32*a* may typically be driven onto a field 54 as shown in FIG. 2. There the suction equipment 52*a* of the truck 32*a* is operated to expel the waste from its portable tank 34*a* onto the field 54. The waste material may be incorporated into the plough layer of the field 54** by conventional tilling to allow for decomposition by soil organisms.

It will be appreciated that a particular embodiment of the invention has been described and that modifications may be made therein without departing from the spirit of the invention or necessarily departing from the scope of the appended claims. For purposes of this specification, the terms "mill" and "milling" should be interpreted broadly as encompassing any equipment and associated process that can divide organic waste to reduce its volume, whether by grinding, pulverizing, cutting etc.

I claim:

1. A system for handling organic waste produced at a food-handling facility, comprising:

a storage tank;

a mill for milling the organic waste;

means for conveying the milled organic waste from the mill to the storage tank; and, a suction line fixed to the storage tank, the suction line comprising an inlet communicating with the interior of the storage tank and an outlet external to the storage tank such that the organic waste can be removed from the storage tank by applying suction to the suction line.

2. The system of claim 1 in which the conveying means comprise a chute connecting the mill to the storage tank.

3. The system of claim 1 comprising:

a ventilation line comprising an inlet communicating with the interior of the storage tank and an outlet external to the storage tank and the facility; and, an air flow producer mounted in the ventilation line to draw air from the interior of the storage tank into the ventilation line thereby placing the interior of the storage tank under negative pressure.

4. A system for handling organic waste produced at a food-handling facility, comprising:

a storage tank installed below ground;

a mill for milling the organic waste;

a conduit coupling the mill to the storage tank such that the milled organic waste is delivered under gravity to the storage tank; and, a rigid suction line fixed to the tank, the suction line comprising an inlet communicating with the interior of the storage tank adjacent to the bottom of the storage tank and an outlet external to the storage tank and the facility;

a connector attached to the outlet of the suction line for coupling the suction line to a suction device thereby to permit the organic waste to be removed from the storage tank with suction applied to the outlet end of the suction line;

a ventilation line comprising an inlet communicating with the interior of the tank and an outlet external to the storage tank and the facility; and, an air flow producer mounted in the ventilation line to draw air from the interior of the storage into the ventilation line, thereby placing the interior of the storage tank under negative pressure, and to discharge the air through the outlet of the ventilation line.

5. A method of handling organic waste produced in a food-handling facility, comprising:

milling the organic waste at the facility;

delivering the milled organic waste to a storage tank at the facility;

drawing the organic waste with suction from the storage tank into a portable tank mounted on a vehicle; and, transporting the organic waste in the portable tank to a disposal site or to a storage site.

6. The method of claim 5 further comprising incorporating the transported organic waste into soil for decomposition by soil organisms.

7. The method of claim 5 further comprising drawing air from the interior of the storage tank thereby to place the interior of the storage tank under negative pressure and discharging the drawn air to points external to the facility.

8. The method of claim 5 comprising agitating the organic waste within the storage tank by forcing air under pressure through the suction line into the interior of the storage tank prior to drawing the organic waste from the storage tank.

* * * * *